United States Patent [19]
Mikovsky et al.

[11] 4,186,080
[45] Jan. 29, 1980

[54] USE OF CATALYST COMPRISING TITANIA AND ZIRCONIA IN HYDROTREATING

[75] Inventors: Richard J. Mikovsky, Trenton, N.J.; Anthony J. Silvestri, Morrisville, Pa.

[73] Assignee: Mobil Oil Corporation, New York, N.Y.

[21] Appl. No.: 896,266

[22] Filed: Apr. 14, 1978

Related U.S. Application Data

[60] Division of Ser. No. 750,754, Dec. 15, 1976, Pat. No. 4,128,505, which is a continuation-in-part of Ser. No. 642,957, Dec. 22, 1975, abandoned.

[51] Int. Cl.$^2$ ............................................. C10G 23/02
[52] U.S. Cl. ................................ 208/143; 208/216 R; 208/217; 208/254 H
[58] Field of Search ............... 208/216 R, 254 H, 143, 208/216 PP, 108, 264, 112; 260/667; 252/439, 469, 465

[56] References Cited

U.S. PATENT DOCUMENTS

| 3,269,958 | 8/1966 | Gatsis | 252/439 |
| 3,278,421 | 10/1966 | Gatsis | 208/264 |
| 3,288,704 | 11/1966 | O'Hara et al. | 208/264 |
| 3,331,769 | 7/1967 | Gatsis | 208/264 |
| 3,340,183 | 9/1967 | Egan | 208/254 H |
| 3,544,450 | 12/1970 | Stine | 208/93 |
| 4,080,286 | 3/1978 | Yanik et al. | 208/469 |

Primary Examiner—George Crasanakis
Attorney, Agent, or Firm—Charles A. Huggett; Raymond W. Barclay; Claude E. Setliff

[57] ABSTRACT

The invention provides a titania-zirconia or a titania-zirconia-alumina catalyst base containing a system of metals, metal oxides or metal sulfides from Groups VIB, VIIB and VIII of the Periodic Table. Such catalyst are useful in the hydrodesulfurization and denitrogenation of hydrocarbon feed stocks and the saturation of aromatics contained therein.

12 Claims, No Drawings

USE OF CATALYST COMPRISING TITANIA AND ZIRCONIA IN HYDROTREATING

CROSS REFERENCE TO RELATED APPLICATIONS

This is a division of application Ser. No. 750,754, filed Dec. 15, 1976, now U.S. Pat. No. 4,128,505 which is a continuation-in-part of application Ser. No. 642,957, filed Dec. 22, 1975, now abandoned.

BACKGROUND OF THE INVENTION

1. Field of the Invention

The present invention is concerned with hydrocarbon desulfurization, denitrogenation and aromatics saturation and a catalyst therefor. More particularly, the invention is concerned with a metal, metal oxide and/or sulfide supported on a base of titania-zirconia or of titania-zirconia-alumina.

2. Discussion of the Prior Art

It is well known that many petroleum stocks contain sulfur and nitrogen. It is desirable for many applications of the petroleum stock itself or of the products made from it that these be removed. This is an operation requiring a catalyst, and one in common use is an alumina base containing cobaltia and molybdena.

So far as is known, no art discloses catalysts or catalyst supports made exclusively from titania-zirconia or titania-zirconia-alumina, or the use of such supports containing cobaltia and molybdena or other metal oxides or sulfides in hydrotreating reactions. U.S. Pat. No. 3,159,588 does disclose a catalyst containing various combinations of titania and zirconia, but it is essential to the composition that silica be present therein. There is no disclosure in U.S. Pat. No. 3,159,588 of the presence of molybdena or cobaltia. U.S. Pat. No. 2,597,889, U.S. Pat. No. 3,137,658 and U.S. Pat. No. 3,887,494 teach compositions of silica-titania, some containing other metals, in hydrocarbon conversion reactions. U.S. Pat. No. 3,264,227 teaches the manufacture of a silica-zirconia-alumina catalyst useful in hydrocarbon conversion reactions.

U.S. Pat. No. 3,278,421 is concerned with refractory inorganic oxides comprising alumina, titania and zirconia, among others, which may contain certain metallic components. There is, however, no disclosure of the particular catalysts of the present invention.

U.S. Pat. No. 3,546,103 teaches hydrodesulfurization with a catalyst of cobalt and molybdenum on an alumina base.

Some of the above-mentioned compositions of the prior art, as for example the silica-titania-zirconia composition, allegedly have desulfurization capabilities. However, the prior art mentioned does not teach or suggest the catalyst of this invention or its use in hydrotreating feed stocks.

SUMMARY OF THE INVENTION

In accordance with the present invention, there is provided a hydrotreating catalyst composition consisting essentially of co-precipitated titania and zirconia, subsequently used as a base for the impregnation of a system selected from (a) the metal oxides or sulfides of Group VIB, (b) the metals, metal oxides and metal sulfides of Groups VIIB and VIII and (c) mixtures thereof. Such mixtures include mixtures between Groups VIB and VIII, Groups VIIB and VIII and from within Group VIII. Preferred amounts of each range from about 20% to about 80% of titania, from about 80% to about 20% of zirconia, from about 1% to about 10% of the Group VIII or Group VIIB metal, oxide or sulfide and from about 2% to about 20% of the Group VIB oxide or sulfide. The amounts of metal, oxide or sulfide components are given in percent by weight of the carrier on a dry basis.

Provided also is a hydrotreating catalyst composition consisting essentially of co-precipitated titania and zirconia, composited with alumina, or of co-precipitated titania, zirconia and alumina, subsequently used as a base for the impregnation of a system selected from the Groups VIIB or VIII of the Periodic Table, their oxides or sulfides and from the metal oxides or sulfides of Group VIB. Preferred amounts of each will be from about 10% to about 50% of alumina, from about 15% to about 45% of titania and from about 25% to about 65% of zirconia. Preferred amounts of metals, metal sulfides and oxides in the catalyst will be from about 2% to about 10% of the Group VIIB or VIII metal, oxide or sulfide and from about 5% to about 20% of the Group VIB metal oxide or metal sulfide. The amounts of metal, oxide or sulfide components are given in percent by weight of the carrier on a dry basis. The invention also provides a method of hydrotreating using the catalysts.

DESCRIPTION OF SPECIFIC EMBODIMENTS

The hydrotreating conditions employed herein involve passing the hydrocarbons over the finished catalyst at temperatures ranging between about 300° F. and 1200° F. preferably between 600° F. and 1000° F., hydrogen pressures above about 100 psig, preferably between about 250 and 2500 psig, and space velocities ranging between about 0.25 and 10. The preferred hydrogen ratios may range between about 500 and 10,000 scf per barrel of feed.

The catalysts of this invention are useful for removing nitrogen, metals and sulfur from such base stocks as naphthas, kerosene or range oil, fuel oils, including jet fuels, furnace oil, heavy gas oil and residua and in saturating aromatics found in these stocks.

With respect to the catalysts made using the $TiO_2$:$ZrO_2$ base, the compositions found to be most useful for hydrotreating consist essentially of those which contain between about 20% and 80% of zirconia, and between about 80% and 20% of titania, the proportions being by weight on a dry basis, from about 1% to about 10% of the carrier of cobaltia and from about 2% to about 20% of the carrier of molybdena.

The mole ratio of $ZrO_2$ to $TiO_2$ is preferably from about 0.5 to about 2.0, with the optimum proportion of ingredients (i.e., $ZrO_2$ and $TiO_2$) being approximately equimolar. It has been found that this range of concentrations will also give the optimum surface area requirement, which is between about 100 $m^2/g$ and about 250 $m^2/g$. As one increases the amount of one component relative to the other, the surface area increases to the value which yields the most useful catalyst (usually at equimolar amounts); as the concentration continues to increase the surface area begins to diminish and will eventually fall below the minimum 100 $m^2/g$. In other words, the surface area will decrease on either side of the equimolar point to that of the pure component.

The compositions made using the $TiO_2$:$ZrO_2$:$Al_2O_3$ base consist essentially of those which contain from about 10% to about 50% of alumina, from about 25% to about 65% of zirconia, and from about 15% to about 45% of titania, the proportions being by weight of the carrier on a dry basis, and from about 2% to about 10% of the carrier of cobaltia and from about 5% to about 20% of the carrier of molybdena.

In the preparation of the titania-zirconia supports of this invention, it is essential that the components be extremely intimately mixed, such as is achieved by co-precipitating of $TiO_2$ and $ZrO_2$. This support may then be composited with $Al_2O_3$, the necessary, or all components may be mixed to give the base $TiO_2$:$ZrO_2$:$Al_2O_3$. Such supports may be prepared by any method which provides an intimate association of the components. Molecular subdivision and distribution of the components in an amorphous, activated gel structure is preferred.

One method of effecting the mentioned co-precipitation involves forming an aqueous solution of acidic compounds of the components, e.g. zirconyl chloride, and titanium tetrachloride, and mixing this solution with a suitable alkali such as ammonium hydroxide, thereby to effect a precipitation of the hydrous oxides of titania and zirconia. The precipitate is then removed by filtration, washed exhaustively to remove contaminating ions, dried and calcined.

Any suitable soluble salts or hydrosols of zirconium and titanium may be employed. The objective is to obtain a mixture of the hydrous oxides, or of insoluble compounds which may be transformed to the oxides upon calcining. Reactants include the titanium and zirconium halides, such as zirconyl chloride, bromide and iodide, titanium tetrachloride, -bromide and -iodide and other salts such as zirconium sulfate and titanium oxalate.

The co-precipitated gels prepared by any of the mentioned methods are recovered, as by filtration or the like, washed exhaustively, dried and calcined at e.g. 1000° F. for 1 to 24 hours to form the oxide mixture.

In those catalysts containing alumina, alumina and water are added to the calcined powder and the mixture is dried.

As is evident from the foregoing disclosure, the catalyst must contain at least two components from the specified Groups. Preferably at least one of the specified components (i.e., metal, metal oxide or metal sulfide) will be selected from Group VIII, e.g., Co, Fe, Ni, Pt and Pd. Another may be selected from Group VIB, e.g., the oxide or sulfide of W, Mo or Cr or from Group VIIB. These can be associated with the $TiO_2$:$ZrO_2$ or the $TiO_2$:$ZrO_2$:$Al_2O_3$ carrier by any method known to the art. For example, they may be impregnated, as was done in the practice of this invention. When this is done, the metals (or their oxides or sulfides) can be added at once and calcined, or they can be added separately, calcining following each addition. They are most usually and preferably added in the form of aqueous solutions of their salts. The salts are selected so that they decompose to the oxide upon calcination, e.g., nitrates.

Co-precipitated $TiO_2$:$ZrO_2$ per se is an amorphous composition having a relatively high surface area. It is known to exhibit remarkable acidic properties and to have catalytic activity [Acidic Properties of Binary Metal Oxides, Shabita et al., Bull. Chem. Soc, Japan, Vol. 46, pp. 2985-2988 (1973). Also J. Res. Inst. Catalystis, Hokkaido Univ, Vol. 19, No. 1, pp. 35-41 (1971)]. The latter reference teaches that the coprecipitated mixture remains amorphous even after calcination at 932° F.

Having described the invention in general terms, the following will specifically illustrate its practice. It will be understood they are illustrations only and are not to be considered as limiting it unnecessarily.

EXAMPLE 1

Preparation of the Catalyst Comprising the Titania-Zirconia Base

The titania-zirconia support was made by reacting a 50-50 mole % mixture of zirconyl chloride and titanium tetrachloride with ammonium hydroxide followed by washing, drying at 212° F. and calcination at 1000° F. A 10 weight % molybdena content and a 3 weight % cobaltia content were obtained by first impregnating the initial calcined support with aqueous ammonium molybdate, treating with the minimum volume of water to dissolve the salt and wet the base, drying at 212° F. and calcining at 1000° F., followed by a separate impregnation with cobaltous nitrate, followed by another calcination. The catalyst was found to have a surface area of 179 $m^2$/gm and an average pore diameter of 80-100 Å. Other details are disclosed in the above-noted Japanese article.

EXAMPLE 2

Preparation of Catalyst Comprising the Titania-Zirconia-Alumina Base

A combination of 18.33 g of $TiCl_4$, (0.167 mole $TiO_2$), 41.73 g of $ZrOCl_2.XH_2O$ (0.167 moles $ZrO_2$) and 80.48 g of $AlCl_3$ (0.167 mole $Al_2O_3$) was swirled in 6 liters of distilled water. The mixture was brought to a pH of 9-10. It was then filtered, washed by dispersing in 6 liters of water, filtered and re-dispersed in 6 liters of water. This mixture was brought to a pH of about 9 with $NH_4OH$, stirred for 15 minutes and allowed to stand overnight. The mixture was filtered, dried at 230° F. and calcined for 2 hours at 1000° F.

To 10.0 g of the $TiO_2$-$ZrO_2$-$Al_2O_3$ base prepared as above was added 1.35 g of molybdic acid dissolved in 0.95 ml of concentrated ammonium hydroxide in about 3.0 ml of water. The acid and ammonium hydroxide solution were added, with mixing, to the solid until all particles were uniformly wet. The mass was then dried at 230° F., followed by calcining for 2 hours at 1000° F. It was cooled to room temperature and impregnated with cobalt (as $Co(NO_3)_2.6H_2O$).

This was done by dissolving 1.34 g of $Co(NO_3)_2.6H_2O$ in 3 ml of water, diluting to 4.0 ml and adding the solution to the molybdenum-impregnated base until all dry particles were wet. It was then dried at 230° F. and calcined for 2 hours at 1000° F.

Evaluation of the $TiO_2$-$ZrO_2$ Based Catalyst

A Kuwait residuum oil (see Column 1, Table 1) was passed over the catalyst under the following conditions:

| | |
|---|---|
| Temperature | 775° F. |
| Pressure | 1000 psig |
| Hydrogen | 10,000 SCF/bbl |
| Space Velocity | 1.0 |
| Catalyst | 25 cc presulfided with $H_2S$ |

Table 1 summarizes the data.

Evaluation of the TiO$_2$-ZrO$_2$-Al$_2$O$_3$ Based Catalyst 0.3 cc, 0.30 g, of CoMo TiO$_2$-ZrO$_2$-Al$_2$O$_3$, containing 10% Mo and 3% Co was used in thiophene desulfurization runs. The catalyst was pretreated with H$_2$S prior to use.

The thiophene was desulfurized under conditions as follows:

| A | B |
|---|---|
| 400 psig | 400 psig |
| 650° F. | 700° F. |
| H$_2$/NC = 20/1 | H$_2$/HC = 20/1 |
| N$_2$ rate = 533.6 cc/min | H$_2$ rate = 533.6 cc/min |
| Thiophene Charge Rate = 5.143 cc/hr (LHSV = 17.1) | Thiophene Charge rate = 5.143 cc/hr (LHSV = 17.1) |

As compared to the commercial catalyst made with 9% Mo and 3% Co on alumina, which by definition here is 100%, activity (relative rate constant), the catalyst used under conditions set out in A and B desulfurized thiophene to the extent of 74% and 58% relative activity respectively, on a per unit volume basis.

TABLE 1

KUWAIT RESIDUUM OVER CoO.MoO$_3$/TiO$_2$ . ZrO$_2$

| Period | 1 | A | B | C | D | E | F | G | H | I |
|---|---|---|---|---|---|---|---|---|---|---|
| Mid-period TOS (hrs.) | — | 2.9 | 14.0 | 26.0 | 38.0 | 49.8 | 61.8 | 73.8 | 85.8 | 96.2 |
| Period Length (hrs.) | — | 5.75 | 16.5 | 7.5 | 16.5 | 7.0 | 17.0 | 7.0 | 17.0 | 4.0 |
| Liquid Properties | | | | | | | | | | |
| Gravity, °API | 18.4 | 29.8 | 25.7 | 23.8 | 22.8 | 22.8 | 22.9 | 23.0 | 23.0 | 22.9 |
| Sulfur, wt. % | 3.92 | 0.377 | 0.982 | 1.473 | 1.681 | 1.752 | 1.708 | 1.770 | 1.870 | 1.871 |
| Nitrogen, wt. % | 0.19 | 0.05 | 0.13 | 0.16 | 0.17 | 0.17 | 0.17 | 0.17 | 0.17 | 0.17 |
| Carbon, wt. % | 84.5 | — | 86.88 | 86.88 | 85.87 | 86.23 | 85.94 | 85.94 | 86.45 | 85.81 |
| Hydrogen, wt. % | 11.4 | — | 12.11 | 12.00 | 11.80 | 11.77 | 11.89 | 11.90 | 11.83 | 11.29 |
| Desulfurization, % | — | 90.5 | 75.1 | 62.7 | 57.4 | 55.6 | 56.8 | 55.2 | 52.7 | 56.6 |
| Denitrogenation, % | — | 73.7 | 31.6 | 15.8 | 10.5 | 10.5 | 10.5 | 10.5 | 10.5 | 10.5 |
| H$_2$ Consumption, SCF/bbl | — | — | 477 | 419 | 254 | 244 | 347 | 367 | 289 | — |
| Liquid Yield, wt. % | — | — | 89.6 | 94.9 | 95.4 | 97.4 | 95.0 | 98.4 | 95.3 | 99.5 |
| Mass Balance, wt. % | — | — | 93.4 | 98.3 | 98.0 | 100.6 | 98.2 | 102.4 | 98.7 | — |

| Period | J | K | L | M | N | O | P | Q |
|---|---|---|---|---|---|---|---|---|
| Mid-period TOS (hrs.) | 100.2 | 111.0 | 123.0 | 135.0 | 147.0 | 159.0 | 171.0 | 183.0 |
| Period Length (hrs.) | 4.0 | 17.5 | 6.5 | 17.5 | 6.5 | 17.5 | 6.5 | 17.5 |
| Liquid Properties | | | | | | | | |
| Gravity, °API | 22.0 | 23.0 | 22.9 | 23.2 | 23.0 | 23.2 | 23.0 | 23.2 |
| Sulfur, wt. % | 1.89 | 2.014 | 1.972 | 1.980 | 2.014 | 2.016 | 1.970 | 1.972 |
| Nitrogen, wt. % | 0.17 | 0.17 | 0.16 | 0.17 | 0.17 | 0.16 | 0.17 | 0.17 |
| Carbon, wt. % | — | 85.91 | 85.91 | 86.05 | 85.53 | 85.70 | 85.68 | 86.01 |
| Hydrogen, wt. % | — | 11.77 | 11.79 | 11.80 | 11.67 | 11.67 | 11.78 | 11.86 |
| Desulfurization | 51.8 | 48.6 | 49.7 | 49.5 | 48.6 | 48.6 | 49.7 | 49.7 |
| Denitrogenation, % | 10.5 | 10.5 | 15.8 | 10.5 | 10.5 | 15.8 | 10.5 | 10.5 |
| H$_2$ Consumption, SCF/bbl | — | 230 | 249 | 262 | 186 | 176 | 268 | 311 |
| Liquid Yield, wt. % | — | 95.0 | 92.3 | 98.6 | 95.0 | 97.6 | 94.2 | 97.3 |
| Mass Balance, wt. % | — | 96.7 | 94.5 | 101.2 | 97.6 | 100.2 | 97.4 | 99.9 |

CONVERSION WITH COMMERCIAL DESULFURIZATION CATALYST

Under the same conditions using a catalyst composed of 9 weight % molybdena and 3% cobaltia on alumina and the same feed stock, the results shown in Table 2 were obtained.

TABLE 2

| Period | Feed | A | B | C | D | E | F | G | H | I | J |
|---|---|---|---|---|---|---|---|---|---|---|---|
| Time Interval (hours) | | 0–3 | 3–6 | 6–22 | 22–30 | 30–46 | 46–54 | 54–70 | 70–78 | 78–95 | 95–98 |
| Mid-Period TOS (hrs.) | | 1.5 | 4.5 | 14 | 26 | 38 | 50 | 62 | 74 | 86.5 | 96.5 |
| Period Length (hrs.) | | 3 | 3 | 16 | 8 | 16 | 8 | 16 | 8 | 17 | 3 |
| Liquid Properties | | | | | | | | | | | |
| Gravity, ° API | 18.4 | 30.7 | 27.0 | 25.7 | 25.0 | 24.7 | 24.5 | 24.2 | 24.1 | 24.0 | 23.8 |
| Sulfur, wt. % | 3.89 | .068 | .27 | .59 | .80 | .94 | 1.08 | 1.18 | 1.29 | 1.36 | 1.44 |
| Nitrogen, wt. % | 0.19 | .041 | .10 | .14 | .16 | .16 | .17 | .17 | .17 | .17 | .17 |
| Carbon, wt. % | 84.75 | 86.1 | 87.5 | 86.6 | 86.7 | 86.4 | 86.2 | 86.4 | 86.0 | 86.7 | 85.5 |
| Hydrogen, wt. % | 11.4 | 11.7 | 12.5 | 12.3 | 12.2 | 12.2 | 12.2 | 12.1 | 12.2 | 12.1 | 12.2 |
| Ni, ppm | 12 | 0.2 | 0.5 | 2.7 | 3.9 | 4.2 | 4.6 | 5.3 | 5.6 | 6.0 | 6.2 |
| V, ppm | 46 | 0.1 | 0.3 | 2.2 | 3.9 | 5.5 | 7.2 | 8.9 | 9.5 | 10.0 | 10.0 |
| Desulfurization, % | — | 98.3 | 93.1 | 84.8 | 79.4 | 75.8 | 72.2 | 69.7 | 66.8 | 65.0 | 63.0 |
| Denitrogenation, % | — | 78.4 | 47.4 | 26.3 | 15.8 | 15.8 | 10.5 | 10.5 | 10.5 | 10.5 | 10.5 |
| % Ni Removal | — | 98.3 | 95.8 | 77.5 | 67.5 | 65.0 | 61.7 | 55.8 | 53.3 | 50.0 | 48.3 |
| % V Removal | — | 99.8 | 99.3 | 95.2 | 93.3 | 88.0 | 84.3 | 80.7 | 79.3 | 78.3 | 78.3 |
| H$_2$ Consumption, (SCF/Bbl) | — | 193 | 676 | 582 | 504 | 516 | 528 | 450 | 529 | 464 | 514 |

Time Avg. Hydrogen Consumption (SCF/BBL) from 50 to 96.5 hours (mid-period TOS) = 482

From the comparison shown it can be seen that after about 50 hours on stream, the catalyst of this invention showed little or no aging at 50–54% desulfurization. The alumina based catalyst, however, although slightly more active, exhibited significant aging at comparable times on stream. Furthermore, the data show that the titania-zirconia catalyzed material consumed approximately 27% less hydrogen for a given degree of sulfur removal over times in excess of 50 hours.

Respecting the decrease in hydrogen consumption, it is believed this is reflected most clearly in a comparison of the liquid product in the two cases. As Table 1 shows, the titania-zirconia based catalyst gave a liquid product containing about 11.8 weight percent of hydrogen. Table 2, on the other hand, shows a liquid product containing about 12.2 weight percent of hydrogen, indicating higher hydrogen consumption for the alumina-based catalyst. The oil used in obtaining the data in Table 2 was the same as shown in Column 1 of Table 1.

Both the $TiO_2$-$ZrO_2$ and the $Al_2O_3$-based catalysts reached a steady state after about 50 hours, so the comparison mentioned above and discussed in detail below was made using data obtained on samples that had been on stream greater than 50 hours. The comparison below was made on the basis of time averaging so the catalysts could be compared at a given level of catalytic performance, e.g., at the same level of desulfurization.

The table below sets forth data calculated from Tables 1 and 2.

|  | Time-Averaged % Desulfurization | Time-Averaged $H_2$ Consumption, SCF/BBL |
|---|---|---|
| TiZr-Catalyst >50 hours, TOS, Periods E-H and K-Q | 51.2 | 268 |
| $Al_2O_3$-Catalyst >50 hours, TOS, Period F-J | 67.7 | 482 |

Time-averaged % desulfurization is calculated by multiplying each period length by the percentage desulfurization in that period, obtaining an overall total and dividing that sum by the sum of the period lengths in all periods used. For example, the 51.2% above is obtained by multiplying 7 (period length for period E in Table 1) by 55.6 (% desulfurization, period E) and so forth through the specified periods, adding to obtain 7250, then dividing by 141.5 (sum of appropriate period lengths).

In a similar manner, the value 67.7 can be calculated from the appropriate data in the various periods. Values for hydrogen consumption are calculated in the same way, using the appropriate period and the figure for hydrogen consumption instead of % desulfurization.

It is known that a direct proportionality exists between hydrogen consumption and the level of desulfurization [Buether, H., and Schmid, B.K., Section III, paper 20, Sixth World Petroleum Congress, June 19, 1963, Frankfort/Main. Arey, W.F., Blackwell, N.E., III, and Reichle, A.D., Seventh World Petroleum Congress, 41167 (1967)]. Therefore, the data can be adjusted to the same degree of desulfurization. Thus, for 67.7% desulfurization, the titania-zirconia based catalyst would consume:

$$67.7 \times 268/51.2 = 354 \text{ SCF/BBL}$$

Therefore, at the same desulfurization level, the titania-zirconia-based catalyst consumes 26.6% less hydrogen than the conventional alumina based catalyst.

It can also be shown by a similar calculation that, if the whole run is used as a basis in both catalyst systems, the titania-zirconia system still consumes about 23% less hydrogen for a given desulfurization level that the alumina based system.

It should be emphasized that the nature of the comparison for a given catalytic performance makes small differences in catalyst composition incidental. The time-averaging calculation, in addition, tends to smooth out the experimental variations in the data, as for example, apparent variations in hydrogen consumption.

Other work, including the desulfurization of thiophene, benzothiophene and dibenzothiophene, has shown that the titania-zirconia-based catalyst of this invention has an inherent hydrogenation capability, relative to its desulfurization activity, about twice that of the conventional alumina based desulfurization catalyst. This entirely unexpected property of the titania-zirconia based catalyst of this invention is extremely important in the long term processing of residua.

We do not wish to be bound by any theory, but the effect of reducing hydrogen consumption might be ascribed to a greater hydrogen-transfer capability of the catalyst. Such capability is important from the standpoint of hydrogen transfer promotion in residua processing where reactants and carrier hydrogen have limited access to the surface. Since such capability would lead to a reduction in hydrogen consumption and since the catalyst of this invention has led to reduced consumption, the stated theory is logical, even though it is speculation.

What is claimed is:

1. A process for hydrotreating a petroleum fraction comprising contacting said petroleum fraction under hydrotreating conditions with a catalyst composition to remove nitrogen and sulfur and to saturate aromatics in said fraction, the catalyst base of which consists essentially of co-precipitated titania and zirconia, wherein the titania-zirconia co-precipitate contains from about 20% to about 80% by weight of titania and from about 80% to about 20% by weight of zirconia, the said base having associated therewith a mixture of (1) cobalt metal, cobalt oxide or cobalt sulfide and (2) molybdenum oxide or molybdenum sulfide.

2. The process of claim 1 wherein cobaltia and molybdena are present in the range of from about 1% to about 10% and from about 2% to about 20%, respectively, both as a weight percent of the finished catalyst.

3. The process of claim 2 wherein cobaltia and molybdena are present to the extent of 3% and 10% by weight respectively.

4. The process of claim 1 wherein the ratio of $ZrO_2$ to $TiO_2$ is from about 0.5 to about 2.0.

5. The process of claim 4 wherein titania and zirconia are present in the co-precipitate in equimolar amounts.

6. The process of claim 1 wherein the surface area of the co-precipitate is from about 100 $m^2/g$ to about 250 $m^2/g$.

7. The process of claim 1 wherein the hydrotreating conditions employed comprise a temperature ranging from about 300° F. to about 1200° F., a hydrogen pressure of from about 250 to about 2500 psig and a space velocity of from about 0.25 to about 10.

8. A process for hydrotreating a petroleum fraction comprising contacting said petroleum fraction under hydrotreating conditions with a catalyst composition to remove nitrogen and sulfur and to saturate aromatics in said fraction, the catalyst base of which consists essentially of from about 10% to about 50% by weight of alumina, from about 15% to about 45% by weight of titania and from about 25% to about 65% by weight of zirconia, the said base having associated therewith constituents selected from the group consisting of (a) Group VIB metal oxides or metal sulfides, (b) Group VIII metals, metal oxides or metal sulfides and (c) mixtures thereof.

9. The process of claim 8 wherein the said multicomponent system is a two-component system consisting of cobaltia and molybdena.

10. The process of claim 9 wherein cobaltia and molybdena are present in the range of from about 2% to about 10% and from about 5% to about 20%, respectively, both as a weight percent of the finished product.

11. The process of claim 8 wherein the weight percent alumina in the alumina-zirconia-titania composite is from about 10 to 50.

12. The process of claim 8 wherein the hydrotreating conditions employed comprise a temperature ranging from about 300° F. to about 1200° F., a hydrogen pressure of from above about 100 psig to about 2500 psig and a space velocity of from about 0.25 to about 10.

* * * * *

UNITED STATES PATENT AND TRADEMARK OFFICE
CERTIFICATE OF CORRECTION

PATENT NO. : 4,186,080
DATED : January 29, 1980
INVENTOR(S) : Richard J. Mikovsky and Anthony J. Silvestri It is certified that error appears in the above-identified patent and that said Letters Patent are hereby corrected as shown below:

Table 1, Column I, Line 8     "56.6" should read --52.6--.

Signed and Sealed this

Twenty-fourth Day of June 1980

[SEAL]

Attest:

SIDNEY A. DIAMOND

*Attesting Officer*     *Commissioner of Patents and Trademarks*